(12) United States Patent
Keith et al.

(10) Patent No.: US 8,863,341 B1
(45) Date of Patent: Oct. 21, 2014

(54) DUAL BRIDGE AIRCRAFT PASSENGER BOARDING RAMP ASSEMBLY AND METHOD

(71) Applicants: William Floyd Keith, White City, OR (US); Christa Keith, White City, OR (US)

(72) Inventors: William Floyd Keith, White City, OR (US); Christa Keith, White City, OR (US)

( * ) Notice: Subject to any disclaimer, the term of this patent is extended or adjusted under 35 U.S.C. 154(b) by 0 days.

(21) Appl. No.: 14/331,501

(22) Filed: Jul. 15, 2014

Related U.S. Application Data

(63) Continuation of application No. 14/198,743, filed on Mar. 6, 2014.

(60) Provisional application No. 61/964,051, filed on Dec. 23, 2013.

(51) Int. Cl.
*E01D 15/00* (2006.01)
*B64F 1/305* (2006.01)

(52) U.S. Cl.
CPC .................................. B64F 1/3055 (2013.01)
USPC ........... 14/71.5; 14/69.5; 114/362; 414/137.1

(58) Field of Classification Search
CPC ............................. B64F 1/3055; E01D 15/00
USPC ................. 14/69.5, 71.5; 114/362; 414/137.1
See application file for complete search history.

(56) References Cited

U.S. PATENT DOCUMENTS

| | | | |
|---|---|---|---|
| 3,123,167 A | 3/1964 | Lichti |
| 3,524,207 A | 8/1970 | Giarretto |
| 3,538,529 A | 11/1970 | Breier |
| 3,693,204 A | 9/1972 | Eggert, Jr. |
| 4,517,698 A | 5/1985 | Lamp'l et al. |
| 5,524,318 A | 6/1996 | Thomas |
| 5,853,150 A | 12/1998 | Kuchenbrod |
| 6,487,743 B1 | 12/2002 | Nicoletti |
| 6,684,443 B2 | 2/2004 | Thomas et al. |
| RE38,804 E | 10/2005 | Stephenson et al. |
| 7,069,611 B2 | 7/2006 | Larson |
| 7,240,388 B2 | 7/2007 | Warford |
| 7,596,826 B2 | 10/2009 | Anderberg |
| 7,690,065 B2 | 4/2010 | Muller et al. |
| 8,006,337 B2 | 8/2011 | Birmingham et al. |
| 8,069,518 B2 | 12/2011 | Saito et al. |
| 8,266,750 B2 | 9/2012 | Peterson |
| 8,505,140 B2 | 8/2013 | Anderberg |
| 2002/0138924 A1 | 10/2002 | Rolfe et al. |
| 2012/0237331 A1 | 9/2012 | Gabrielson |

*Primary Examiner* — Raymond W Addie
(74) *Attorney, Agent, or Firm* — Jerry Haynes Law (57) ABSTRACT

A ramp assembly for deplaning passengers from and boarding passengers on an airplane includes a level deck having a front deck edge, at least one bridge connector assembly carried by the level deck at the front deck edge and at least one floating upper bridge carried by the at least one bridge connector assembly. The at least one bridge connector assembly facilitates horizontal pivoting movement, vertical pivoting movement and side-to-side movement of the at least one floating upper bridge relative to the level deck. A passenger deplaning and boarding method is also disclosed.

20 Claims, 8 Drawing Sheets

DUAL BRIDGE AIRCRAFT PASSENGER BOARDING RAMP ASSEMBLY AND METHOD

CROSS-REFERENCE TO RELATED APPLICATIONS

This application is a continuation of parent application Ser. No. 14/198,743, filed Mar. 6, 2014 and entitled "DUAL BRIDGE AIRCRAFT PASSENGER BOARDING RAMP ASSEMBLY AND METHOD", which claims the benefit of U.S. provisional application No. 61/964,051, filed Dec. 23, 2013 and entitled "DUAL BRIDGE AIRCRAFT PASSENGER BOARDING RAMP", which provisional application and parent application are incorporated by reference herein in their entireties.

FIELD OF THE INVENTION

Illustrative embodiments of the disclosure generally relate to structures and methods for deplaning passengers from and boarding passengers onto aircraft. More particularly, illustrative embodiments of the disclosure relate to a dual bridge aircraft passenger boarding ramp assembly having at least one adjustable bridge to accommodate various types of aircraft in the boarding of passengers onto the aircraft and a passenger deplaning and boarding method.

BACKGROUND OF THE INVENTION

Conventional boarding and deplaning of passengers onto and from a commercial type aircraft at a boarding gate of an airport may be accomplished using a passenger boarding bridge or jet bridge. The conventional systems and methods of boarding and deplaning passengers may require that a passenger boarding bridge be docked with the aircraft. Because of the varying lengths of aircraft fuselages and positioning of ground support equipment, however, not all aircraft can be parked in the same position at the boarding gate. Consequently, the forward cabin door of one aircraft may be located in a different position than the forward cabin door of a subsequent aircraft. Positioning the passenger boarding bridge for proper alignment with the forward cabin door of each aircraft may therefore require both horizontal and vertical adjustments of the bridge upon arrival of the aircraft.

Accordingly, a dual bridge aircraft passenger boarding ramp assembly having at least one adjustable bridge to accommodate various types of aircraft in the boarding of passengers onto the aircraft and a passenger deplaning and boarding method may be desirable.

SUMMARY OF THE INVENTION

Illustrative embodiments of the disclosure are generally directed to a ramp assembly for deplaning passengers from and boarding passengers on an airplane. An illustrative embodiment of the ramp assembly includes a level deck having a front deck edge, at least one bridge connector assembly carried by the level deck at the front deck edge and at least one floating upper bridge carried by the at least one bridge connector assembly. The at least one bridge connector assembly facilitates horizontal pivoting movement, vertical pivoting movement and side-to-side movement of the at least one floating upper bridge relative to the level deck.

Illustrative embodiments of the disclosure are further generally directed to a passenger deplaning and boarding method. An illustrative embodiment of the passenger deplaning and boarding method includes providing a ramp assembly including a level deck having a front deck edge, at least one bridge connector assembly carried by the level deck at the front deck edge and at least one floating upper bridge carried by the at least one bridge connector assembly, the at least one bridge connector assembly facilitates horizontal pivoting movement, vertical pivoting movement and side-to-side movement of the at least one floating upper bridge relative to the level deck; parking an aircraft having at least one aircraft door; deploying the ramp assembly by aligning the at least one floating upper bridge of the ramp assembly with the at least one aircraft door; supporting the at least one floating upper bridge in the at least one aircraft door of the aircraft; deplaning a first group of passengers from the aircraft using the ramp assembly; and boarding a second group of passengers from the aircraft using the ramp assembly.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
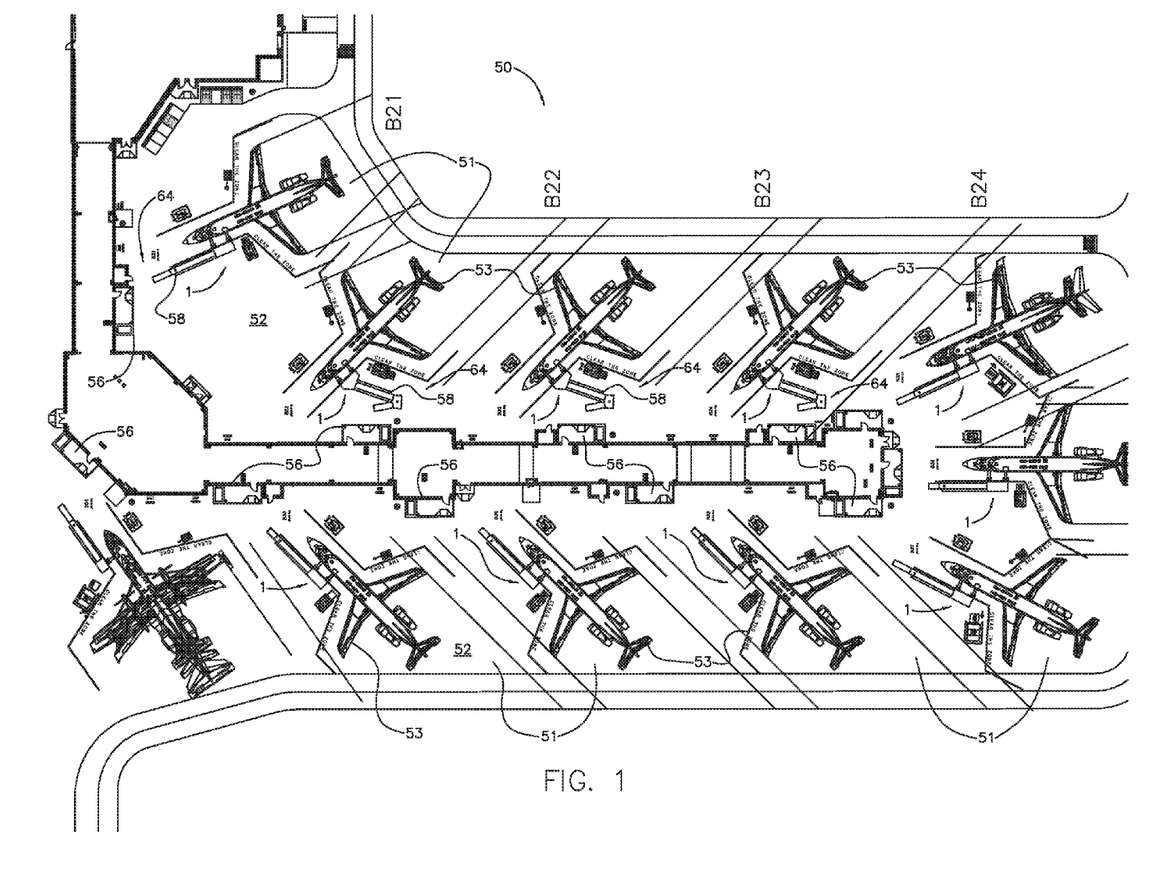
FIG. 1 is a top view of multiple terminals at an airport with an aircraft parked at each terminal and an illustrative embodiment of a dual bridge aircraft passenger boarding ramp assembly deployed at each aircraft to facilitate boarding and deplaning of passengers onto and from the aircraft.

Referring initially to FIG. 1 of the drawings, an illustrative embodiment of the dual bridge aircraft passenger boarding ramp assembly, hereinafter ramp assembly, is generally indicated by reference numeral 1. The various components of the ramp assembly 1, which will be hereinafter described, may be fabricated from square tubing of aluminum or other suitable metal or material. In exemplary application, which will be hereinafter described, the ramp assembly 1 may be part of a swinging gate ramp 64 which is selectively deployed at an aircraft 53 parked on the tarmac 52 at a terminal 51 of an airport 50. The deployed swinging gate ramp 64 with the ramp assembly 1 facilitates deplaning of passengers from the aircraft 53 boarding of passengers onto the aircraft 53. The swinging gate ramp 64 may include a main boarding ramp 58 to enable the passengers to reach the aircraft 53 from the tarmac 52 which is outside the gate 56 of the terminal 51. As will be hereinafter described, the ramp assembly 1 is capable of multi-positional adjustment to accommodate aircraft 53 which are successively parked in different positions at the terminal 51.

Figure 2:
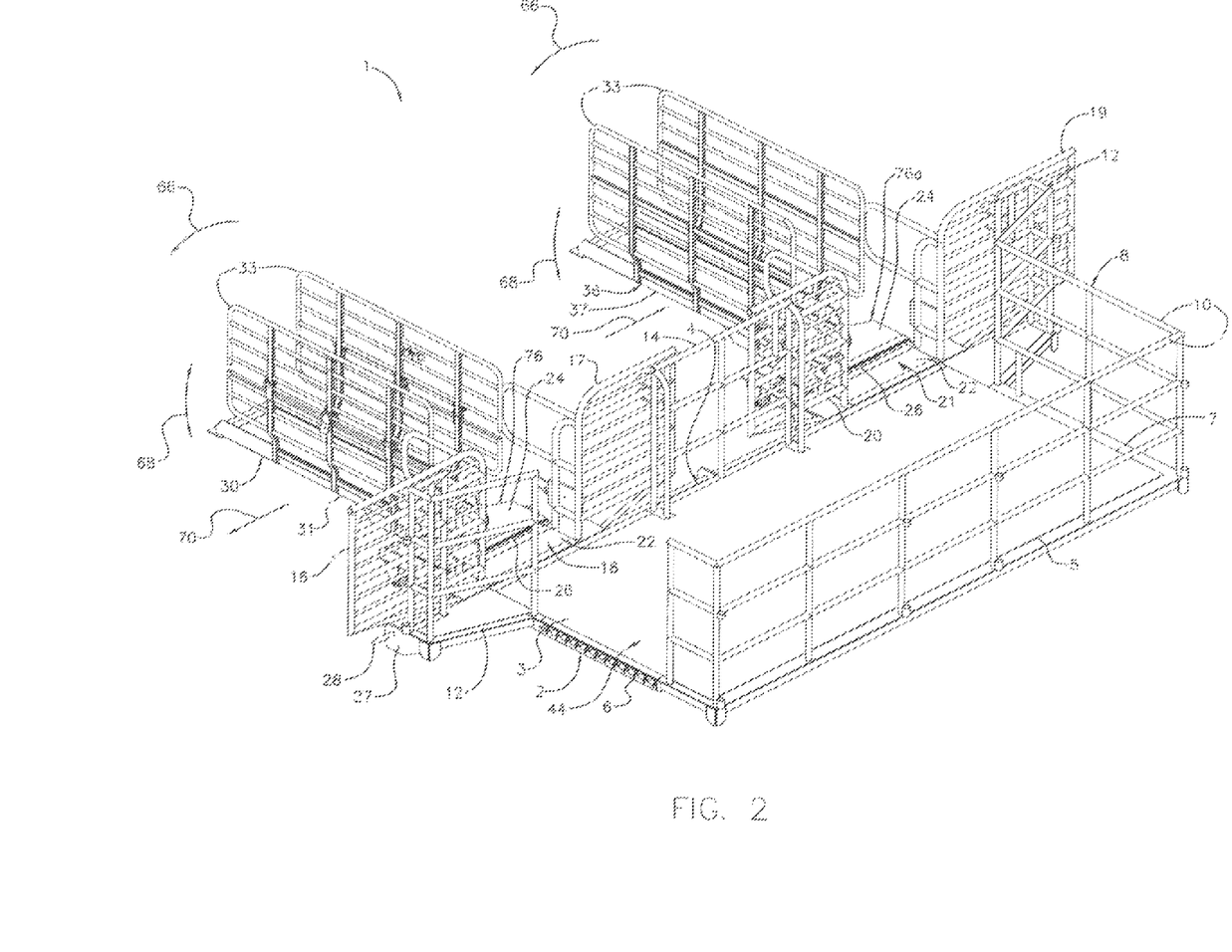
FIG. 2 is a rear perspective view of an illustrative embodiment of the dual bridge aircraft passenger boarding ramp assembly.
Figure 3:
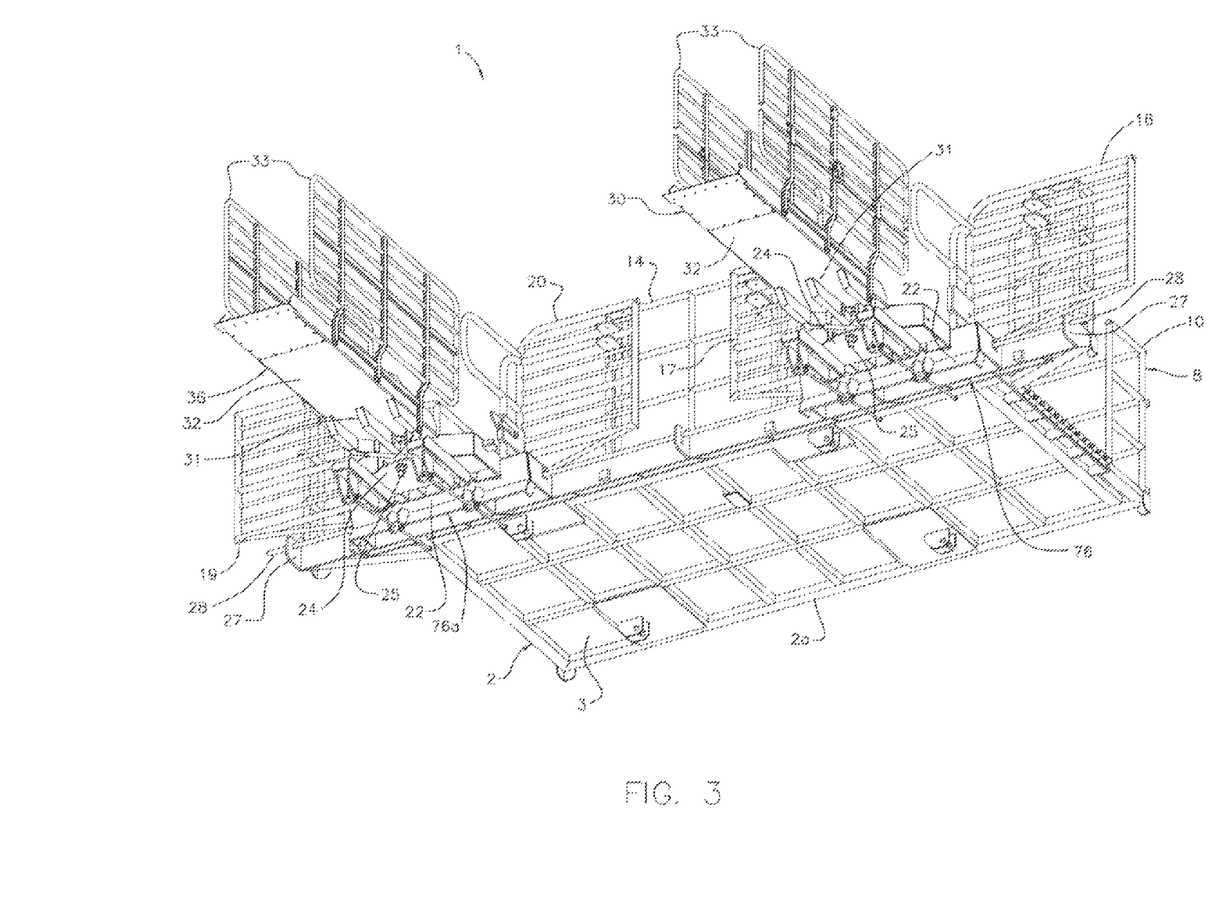
FIG. 3 is a bottom perspective view of an illustrative dual bridge aircraft passenger boarding ramp assembly.

Referring next to FIGS. 2 and 3 of the drawings, the boarding ramp 1 may include a level deck 2. The level deck 2 may include a level deck frame 2a (FIG. 3) and a level deck platform 3 on the level deck frame 2a. In some embodiments, the level deck 2 may have a generally elongated, rectangular shape with a front deck edge 4, a rear deck edge 5 and side deck edges 6 and 7, respectively. In other embodiments, the level deck 2 may have alternative shapes. At least one platform guardrail 8 may extend upwardly from the level deck 2 adjacent to the edges thereof. In some embodiments, the platform guardrail 8 may include a rear platform guardrail segment 10 which extends upwardly from the level deck platform 3 along the rear deck edge 5 and the side deck edge 7. A pair of side platform guardrail segments 12 may extend upwardly from the level deck platform 3 at the respective side deck edges 6 and 7. A front platform guardrail segment 14 may extend upwardly from the level deck platform 3 along the front deck edge 4 and between the side platform guardrail segments 12.

At least one main boarding walk space 44 may be provided in the platform guardrail 8. As illustrated in FIG. 2, in some embodiments, the main boarding walk space 44 may be provided between the rear platform guardrail segment 10 and one of the side platform guardrail segments 12. In other embodiments, the main boarding walk space 44 may be provided at any other location or locations in the platform guardrail 8.

Figure 4:
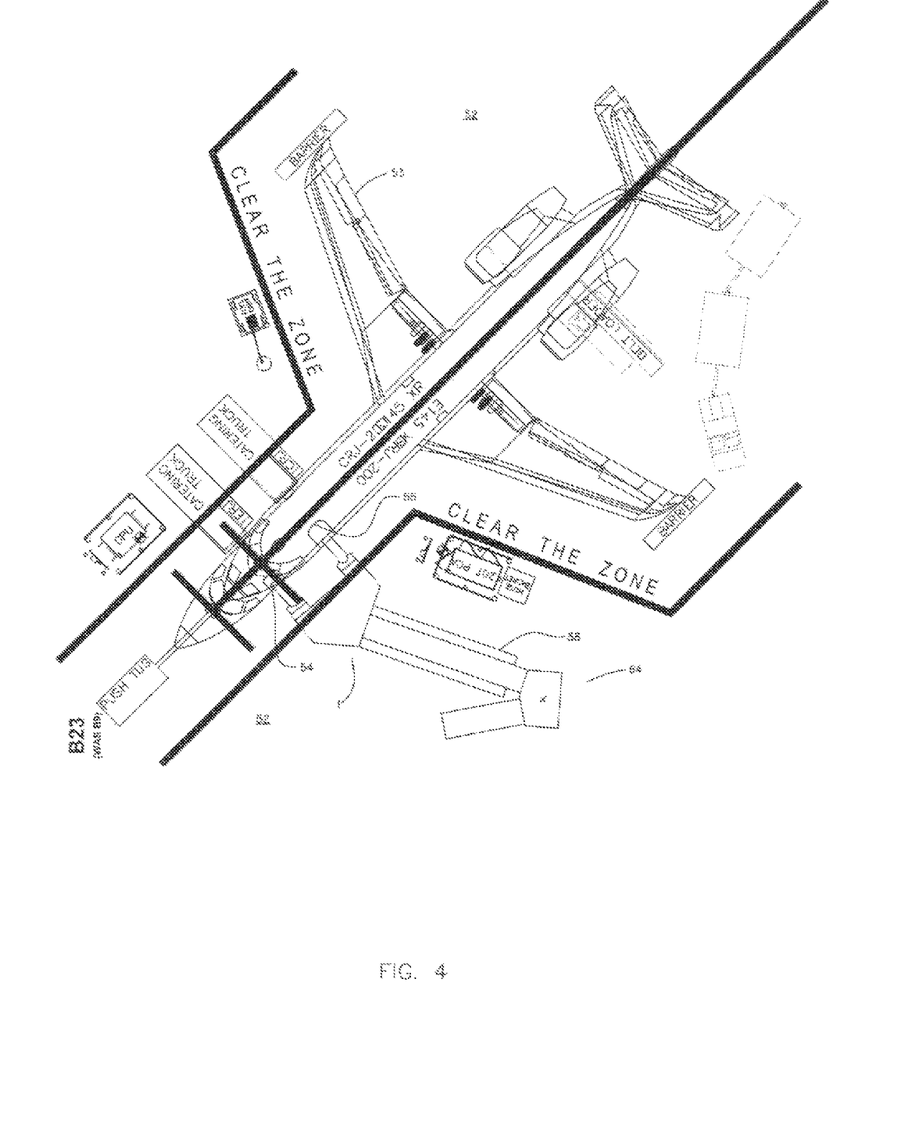
FIG. 4 is a top view of an aircraft parked at an aircraft terminal with an illustrative dual bridge aircraft passenger boarding ramp assembly deployed at the aircraft in exemplary application thereof.
Figure 5:
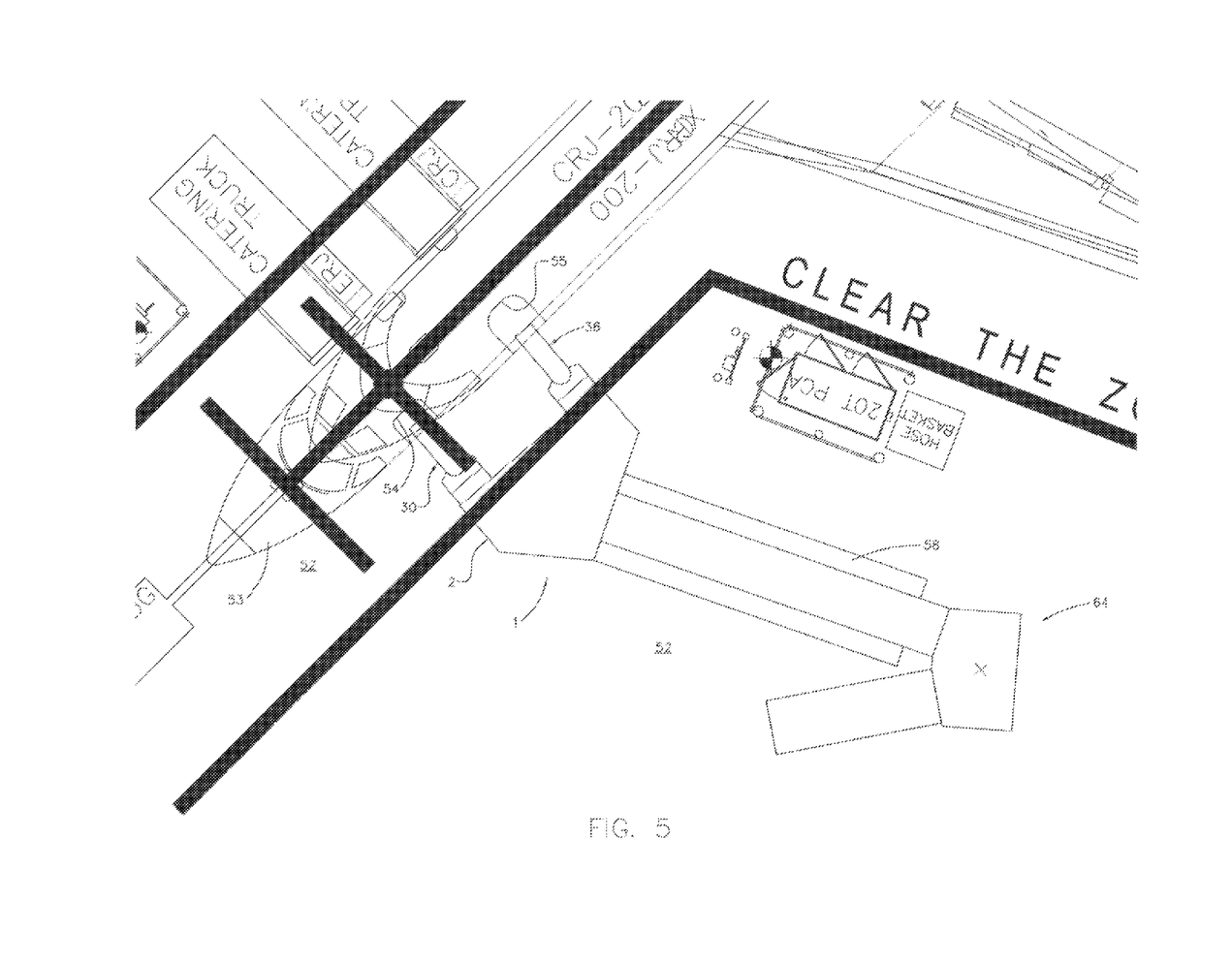
FIG. 5 is a top view of an illustrative dual bridge aircraft passenger boarding ramp assembly deployed at a first aircraft with a main boarding ramp extending away from the dual bridge aircraft passenger boarding ramp in exemplary application thereof.
Figure 6:
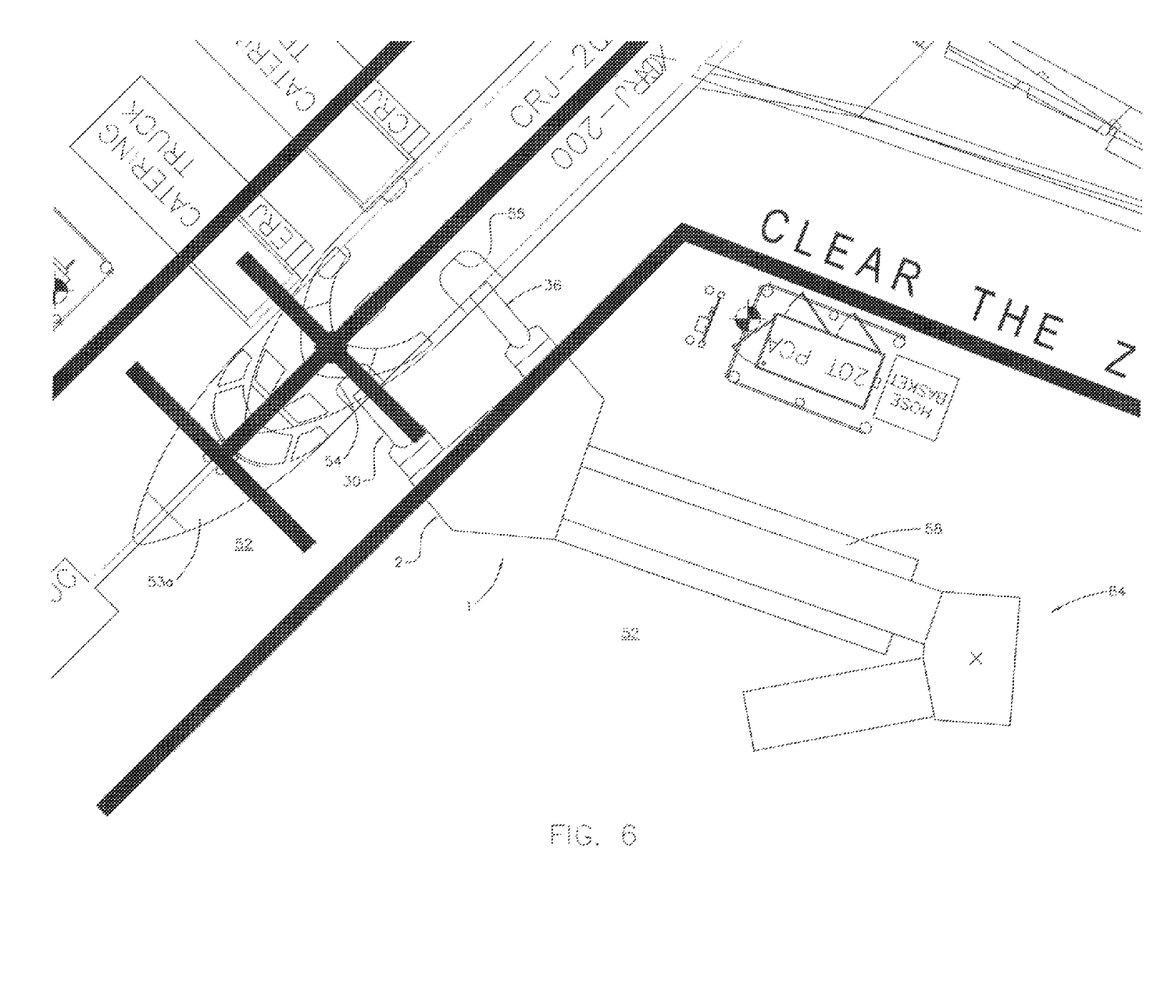
FIG. 6 is a top view of an illustrative dual bridge aircraft passenger boarding ramp assembly deployed at a second aircraft with a main boarding ramp extending away from the dual bridge aircraft passenger boarding ramp in exemplary application thereof.

At least one floating upper bridge 30, 36 extends from the level deck 2. In some embodiments, a forward floating upper bridge 30 and an aft floating upper bridge 36 may extend from the level deck 2 in spaced-apart relationship with respect to each other. As illustrated in FIG. 2, a forward bridge connector assembly 76 may connect the forward floating upper bridge 30 to the level deck 2. An aft bridge connector assembly 76a may connect the aft floating upper bridge 36 to the level deck 2. The forward bridge connector assembly 76 and the aft bridge connector assembly 76a may facilitate multi-positional movement of the forward floating upper bridge 30 and the aft floating upper bridge 36, respectively, relative to the level deck 2. Accordingly, the bridge connector assemblies 76, 76a may facilitate horizontal pivoting movement of the forward floating upper bridge 30 and the aft floating upper bridge 36 with respect to the level deck 2, as indicated by the horizontal pivot arrows 66; vertical pivoting or articulating movement of the forward floating upper bridge 30 and the aft floating upper bridge 36 with respect to the level deck 2, as indicated by the vertical pivot arrows 68; and side-to-side sliding movement of the forward floating upper bridge 30 and the aft floating upper bridge 36 with respect to the level deck 2, as indicated by the slide arrows 70. The horizontal pivoting movement 66, the vertical pivoting or articulating movement 68 and the horizontal sliding movement 70 of each of the forward floating upper bridge 30 and the aft floating upper bridge 36 facilitate alignment of the forward floating upper bridge 30 or the aft floating upper bridge 36 with a forward cabin door 54 (FIG. 4) on an aircraft 53 preparatory to the boarding and deplaning of passengers, as will be hereinafter further described. In some applications, the forward floating upper bridge 30 and the aft floating upper bridge 36 may be selectively positional between the extended functional position illustrated in FIGS. 2 and 3 for application of the ramp assembly 1 in deplaning and boarding passengers and a stowed position (not illustrated) in which the forward floating upper bridge 30 and the aft floating upper bridge 36 are pivoted upwardly via the respective bridge connector assemblies 76, 76a.

As illustrated in FIGS. 2 and 3, each of the forward bridge connector assembly 76 and the aft bridge connector assembly 76a may include a sliding bridge block 22 which extends from the level deck 2. The sliding bridge block 22 may be mounted in sliding relationship to the front deck edge 4 of the level deck 2 according to the knowledge of those skilled in the art. Accordingly, as illustrated in FIG. 2, multiple shaft mounting tabs 27 may extend from the level deck frame 2a (FIG. 3) of the level deck 2. A horizontal bridge slide shaft 28 may be supported by the shaft mounting tabs 27. In some embodiments, the sliding bridge block 22 may be mounted in sliding relationship to the bridge slide shaft 28 according to the knowledge of those skilled in the art. A pair of lock collars (not illustrated) may be provided on the bridge slide shaft 28 to limit the side-to-side sliding distance of the sliding bridge block 22 on the bridge slide shaft 28. In some embodiments, the bridge slide shaft 28 may be mounted in sliding relationship to the shaft mounting tabs 27 according to the knowledge of those skilled in the art. Therefore, the bridge slide shaft 28 facilitates horizontal side-to-side movement of each corresponding one of the forward floating upper bridge 30 and the aft floating upper bridge 36, as indicated by the slide arrows 70 in FIG. 2.

Each bridge connector assembly 76, 76a may further include a floating upper bridge pivot block 24 which is pivotally attached to the corresponding sliding bridge block 22 along a block hinge 26. Accordingly, each of the forward floating upper bridge 30 and the aft floating upper bridge 36 is capable of vertical pivoting movement or articulation about the corresponding block hinge 26, as indicated by the vertical pivot arrows 68 in FIG. 2.

As illustrated in FIG. 3, each bridge connector assembly 76, 76a may further include a bridge pivot pin 25 which pivotally attaches the forward floating upper bridge 30 and the aft floating upper bridge 36, respectively, to the floating upper bridge pivot block 24 of the corresponding bridge connector assembly 76, 76a. Accordingly, each of the forward floating upper bridge 30 and the aft floating upper bridge 36 is capable of horizontal pivoting movement about the corresponding floating upper bridge pivot block 24, as indicated by the horizontal pivot arrows 66 in FIG. 2. In some embodiments, each of the forward floating upper bridge 30 and the aft floating upper bridge 36 may be capable of a horizontal pivoting movement 66 of about 15 degrees in either direction about the corresponding floating upper bridge pivot block 24.

As further illustrated in FIG. 3, each of the forward floating upper bridge 30 and the aft floating upper bridge 36 may include a bridge mount frame 31 which is pivotally attached to the floating upper bridge pivot block 24 of the corresponding bridge connector assembly 76, 76a via the bridge pivot pin 25. A generally elongated bridge platform 32 may be mounted on the bridge mount frame 31 according to the knowledge of those skilled in the art. A pair of bridge guardrails 33 may extend upwardly from opposite sides of the bridge platform 32.

As illustrated in FIG. 2, an outer bridge barrier 16 and an inner bridge barrier 17 may be supported by the level deck 2 in spaced-apart relationship to each other on opposite sides of the bridge connector assembly 76 of the forward floating upper bridge 30. A forward bridge walk space 18 may extend between the outer bridge barrier 16 and the inner bridge barrier 17 and over the forward bridge connector assembly 76. An outer bridge barrier 19 and an inner bridge barrier 20 may be supported by the level deck 2 in spaced-apart relationship to each other on opposite sides of the aft bridge connector assembly 76a of the aft floating upper bridge 36. An aft bridge walk space 21 may extend between the outer bridge barrier 19 and the inner bridge barrier 20 and over the aft bridge connector assembly 76a.

Referring next to FIGS. 1 and 4-6 of the drawings, in exemplary application, the swinging gate ramp 64 of which the ramp assembly 1 is a part can be selectively configured on the tarmac 52 between a deployed position for the deplaning and boarding of passengers on an aircraft 53 and a stowed position when not in use. The level deck 2 of the ramp assembly 1 may be secured to the tarmac 52 via a base plate (not illustrated) that has a centrally-mounted spindle. The frame of the swinging gate ramp 64 may utilize a collar (not illustrated) which is mounted centrally on the frame closest to the lower end of the main boarding ramp 58. The collar may be mated to the centrally located spindle which protrudes from the base plate, allowing the swinging gate ramp 64 to pivot as a whole. This pivoting motion may be limited by attached security chains (not illustrated) so as to prevent accidental contact of the swinging gate ramp 64 with parked aircraft 53. When the main boarding ramp 58 is pivoted to a position closest to the aircraft 53, the swinging gate ramp 64 is in the deployed position. When the main boarding ramp 58 is pivoted away from the aircraft 53, the swinging gate ramp 64 is in the stowed position. The type of aircraft 53 which is parked at the terminal 51 at the time of deployment of the swinging gate ramp 64 may determine which of the forward floating upper bridge 30 and the aft floating upper bridge 36 is deployed into the forward cabin door 54 of the aircraft 53.

In the deployed position of the swinging gate ramp 64, the ramp assembly 1 is positioned adjacent to a first aircraft 53 (FIG. 5) after the first aircraft 53 is parked at a terminal 51 at an airport 50 to facilitate deplaning of a first group of passengers (not illustrated) from the first aircraft 53, which may be a commercial aircraft such as an ERJ 145 type aircraft, for example and without limitation, and then boarding of a second group of passengers on the first aircraft 53. The ramp assembly 1 may be subsequently deployed adjacent to a second aircraft 53a (FIG. 6), which may be a commercial aircraft such as a CRJ 200 type aircraft, for example and without limitation, after the second aircraft 53a is parked at the terminal 51 to facilitate deplaning and boarding of passengers in like manner. The ramp assembly 1 facilitates expeditious alignment of the forward floating upper bridge 30 with the forward cabin door 54 of the first aircraft 53 and then expeditious alignment of the aft floating upper bridge 36 with the forward cabin door 54 of the second aircraft 53a without the need for horizontal and/or vertical adjustment of a main boarding ramp 58 which interfaces with the ramp assembly 1 to accommodate differences in positions of the forward cabin door 54 on the successive aircraft 53, 53a. This expedient reduces the time which is required for deplaning the first group of passengers and boarding the second group of passengers. The main boarding ramp 58 may be pivotally attached to the level deck 2 of the ramp assembly 1 at the main boarding walk space 44 (FIG. 2) in the platform guardrail 8.

As the first aircraft 53 pulls into the terminal 51 after landing, the ramp assembly 1 is moved into proximity to the first aircraft 53. The forward floating upper bridge 30 is first placed into proximity to the forward cabin door 54 of the first aircraft 53 and then aligned with the forward cabin door 54. Accordingly, the forward floating upper bridge 30 may be horizontally pivoted 66, vertically articulated or pivoted 68 and/or slid back and forth 70 (FIG. 2) to facilitate precise alignment or registration of the forward floating upper bridge 30 with the forward cabin door 54. Once these adjustments are made, the forward floating upper bridge 30 may be inserted in the forward cabin door 54 and rested inside the first aircraft 53.

The deplaning first group of passengers (not illustrated) exits the first aircraft 53 by walking through the forward cabin door 54, along the forward floating upper bridge 30 and through the forward bridge walk space 18 onto the level deck 2. The deplaning passengers may then traverse the main boarding ramp 58 and walk across the tarmac 52 to the gate 56 of the terminal 51. The boarding second group of passengers (not illustrated) may then walk from the gate 56 of the terminal 51 across the tarmac 52 and ascend the main boarding ramp 58 to the level deck 2 of the ramp assembly 1. The boarding passengers may enter the first aircraft 53 by walking from the level deck 2 through the forward bridge walk space 18 along the forward floating upper bridge 30 and through the forward cabin door 54.

After the boarding passengers have boarded the first aircraft 53, the forward floating upper bridge 30 of the ramp assembly 1 is removed from the forward cabin door 54 of the first aircraft 53, which then departs. The second aircraft 53a subsequently lands and then arrives and parks at the terminal 52. For example and without limitation, the second aircraft 53a may be a CRJ 200 type aircraft. The forward/aft positions of the forward cabin door 54 of the second aircraft 53a may differ from the position of the forward cabin door 54 of the first aircraft 53. Therefore, the aft floating upper bridge 36 may be horizontally pivoted 66, vertically articulated or pivoted 68 and/or slid back and forth 70 (FIG. 2) to facilitate precise alignment or registration and insertion of the aft floating upper bridge 36 into the forward cabin door 54. Deplaning of the first group of passengers and boarding of the second group of passengers may then proceed as was heretofore described. Passengers can be subsequently deplaned from and boarded onto additional aircraft 53 in a similar manner. In some applications, when the ramp assembly 1 is not in use, the forward floating upper bridge 30 and the aft floating upper bridge 36 may be selectively pivoted upwardly via the respective bridge connector assemblies 76, 76a to the stowed position (not illustrated). In some applications, canopies (not illustrated) may be deployed over the level deck 2, the forward floating upper deck 30 and/or the aft floating upper deck 36 to shield the passengers from the sun or inclement weather during deplaning and boarding of the aircraft 53.

Figure 7:
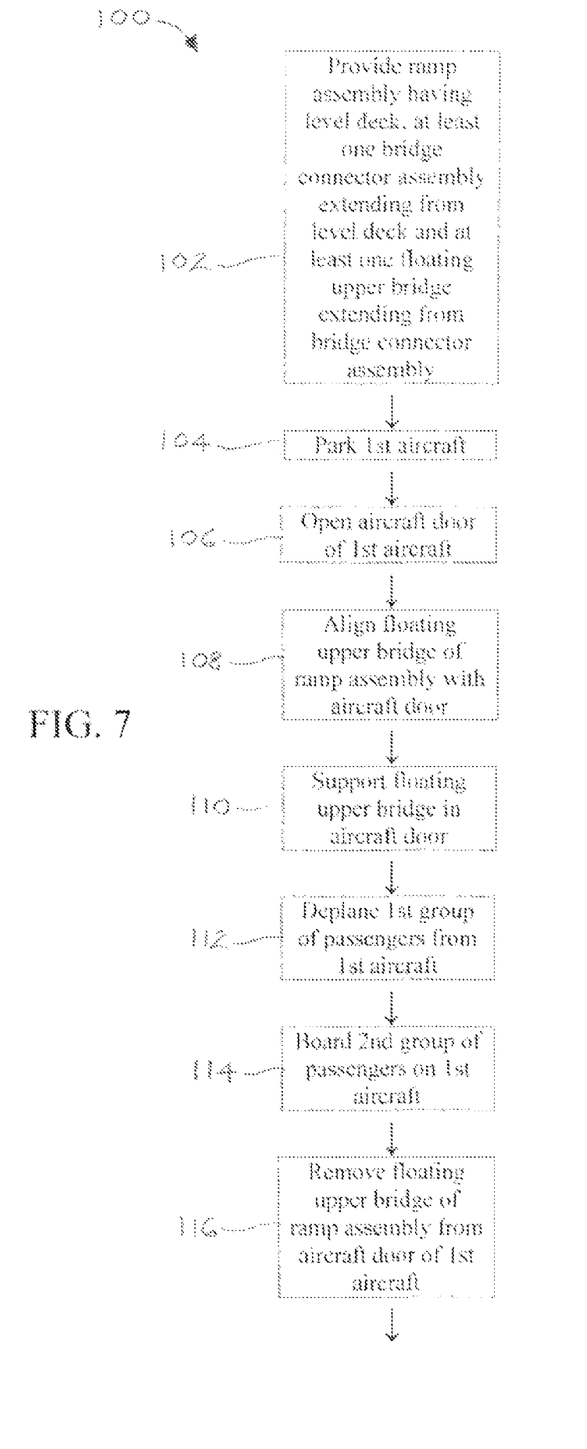
FIG. 7 is a flow diagram of an illustrative embodiment of a passenger deplaning and boarding method.

Referring next to FIG. 7 of the drawings, a flow diagram 100 of an illustrative embodiment of a passenger deplaning and boarding method is illustrated. At block 102, a ramp assembly is provided. The ramp assembly includes a level deck, at least one bridge connector assembly extending from the level deck and at least one floating upper bridge extending from the bridge connector assembly. In some embodiments, the ramp assembly may include a forward floating upper bridge and an aft floating upper bridge connected to the level deck via a respective pair of bridge connector assemblies. At block 104, a first aircraft is parked. At block 106, at least one aircraft door on the first aircraft is opened. At block 108, the ramp assembly is deployed by aligning one of the forward floating upper bridge and the aft floating upper bridge of the ramp assembly with the aircraft door on the first aircraft. The forward or aft floating upper bridge may be adjusted in a vertically pivoting movement, a horizontally pivoting movement and/or a side-to-side sliding movement to facilitate alignment with the aircraft door.

At block 110, the forward or aft floating upper bridge is supported inside the aircraft door of the first aircraft. At block 112, a first group of passengers is deplaned from the first aircraft using the ramp assembly. At block 114, a second group of passengers is boarded onto the first aircraft using the ramp assembly. At block 116, the forward or aft floating upper bridge is removed from the aircraft door of the first aircraft. At block 118, the first aircraft departs.

At block 120, a second aircraft is parked. At block 122, at least one aircraft door on the second aircraft is opened. At block 124, the ramp assembly is deployed by aligning the forward floating upper bridge or the aft floating upper bridge of the ramp assembly with the aircraft door on the second aircraft. The forward or aft floating upper bridge may be adjusted in a vertically pivoting movement, a horizontally pivoting movement and/or a side-to-side sliding movement to facilitate alignment with the aircraft door.

At block 126, the forward or aft floating upper bridge is supported inside the aircraft door of the second aircraft. At block 128, a first group of passengers is deplaned from the second aircraft using the ramp assembly. At block 130, a second group of passengers is boarded onto the second aircraft using the ramp assembly. At block 132, the forward or aft floating upper bridge is removed from the aircraft door of the second aircraft. At block 134, the second aircraft departs.

While various illustrative embodiments of the disclosure have been described above, it will be recognized and understood that various modifications can be made in the disclosure and the appended claims are intended to cover all such modifications which may fall within the spirit and scope of the embodiments of the disclosure.

What is claimed is:

1. A ramp assembly for deplaning passengers from and boarding passengers on an airplane, comprising:
    a level deck having a front deck edge;
    at least one bridge connector assembly carried by the level deck at the front deck edge;
    at least one floating upper bridge carried by the at least one bridge connector assembly; and
    the at least one bridge connector assembly facilitates horizontal pivoting movement, vertical pivoting movement and side-to-side movement of the at least one floating upper bridge relative to the level deck.

2. The ramp assembly of claim 1 wherein the at least one bridge connector assembly comprises a pair of bridge connector assemblies spaced-apart along the front deck edge of the level deck and the at least one floating upper bridge comprises a pair of spaced-apart floating upper bridges carried by the pair of bridge connector assemblies, respectively.

3. The ramp assembly of claim 1 further comprising a platform guardrail carried by the level deck.

4. The ramp assembly of claim 3 further comprising at least one main boarding walk space in the platform guardrail.

5. The ramp assembly of claim 3 wherein the platform guardrail comprises a rear platform guardrail segment, a front platform guardrail segment, at least one side platform guardrail segment spaced-apart from the front platform guardrail segment and a bridge walk space between the front platform guardrail segment and the at least one side platform guardrail segment.

6. The ramp assembly of claim 1 wherein the at least one bridge connector assembly comprises a sliding bridge block carried by the level deck at the front deck edge in sliding relationship thereto and a floating upper bridge pivot block carried by the sliding bridge block in vertically pivoting relationship thereto, and wherein the at least one floating upper bridge is carried by the floating upper bridge pivot block in horizontally pivoting relationship thereto.

7. The ramp assembly of claim 6 further comprising a plurality of shaft mounting tabs carried by the level deck and a bridge slide shaft carried by the plurality of shaft mounting tabs, and wherein the sliding bridge block is carried by the bridge slide shaft in sliding relationship thereto.

8. The ramp assembly of claim 7 wherein the at least one floating upper bridge comprises a bridge mount frame carried by the floating upper bridge pivot block in horizontally pivoting relationship thereto and a bridge platform carried by the bridge mount frame.

9. A swinging gate ramp for deplaning passengers from and boarding passengers on an airplane, comprising:
    a main boarding ramp;
    a ramp assembly including:
        a level deck carried by the main boarding ramp, the level deck having a front deck edge;
        at least one bridge connector assembly carried by the level deck at the front deck edge;
        at least one floating upper bridge carried by the at least one bridge connector assembly; and
        the at least one bridge connector assembly facilitates horizontal pivoting movement, vertical pivoting movement and side-to-side movement of the at least one floating upper bridge relative to the level deck.

10. The swinging gate ramp of claim 9 wherein the at least one bridge connector assembly comprises a pair of bridge connector assemblies spaced-apart along the front deck edge of the level deck and the at least one floating upper bridge comprises a pair of spaced-apart floating upper bridges carried by the pair of bridge connector assemblies, respectively.

11. The ramp assembly of claim 9 further comprising a platform guardrail carried by the level deck.

12. The ramp assembly of claim 11 further comprising at least one main boarding walk space in the platform guardrail.

13. The ramp assembly of claim 11 wherein the platform guardrail comprises a rear platform guardrail segment, a front platform guardrail segment, at least one side platform guardrail segment spaced-apart from the front platform guardrail segment and a bridge walk space between the front platform guardrail segment and the at least one side platform guardrail segment.

14. The ramp assembly of claim 9 wherein the at least one bridge connector assembly comprises a sliding bridge block carried by the level deck at the front deck edge in sliding relationship thereto and a floating upper bridge pivot block carried by the sliding bridge block in vertically pivoting relationship thereto, and wherein the at least one floating upper bridge is carried by the floating upper bridge pivot block in horizontally pivoting relationship thereto.

15. The ramp assembly of claim 14 further comprising a plurality of shaft mounting tabs carried by the level deck and a bridge slide shaft carried by the plurality of shaft mounting tabs, and wherein the sliding bridge block is carried by the bridge slide shaft in sliding relationship thereto.

16. The ramp assembly of claim 15 wherein the at least one floating upper bridge comprises a bridge mount frame carried by the floating upper bridge pivot block in horizontally pivoting relationship thereto and a bridge platform carried by the bridge mount frame.

17. A passenger deplaning and boarding method, comprising:

providing a ramp assembly including a level deck having a front deck edge, at least one bridge connector assembly carried by the level deck at the front deck edge and at least one floating upper bridge carried by the at least one bridge connector assembly, the at least one bridge connector assembly facilitates horizontal pivoting movement, vertical pivoting movement and side-to-side movement of the at least one floating upper bridge relative to the level deck;

parking an aircraft having at least one aircraft door;

deploying the ramp assembly by aligning the at least one floating upper bridge of the ramp assembly with the at least one aircraft door;

supporting the at least one floating upper bridge in the at least one aircraft door of the aircraft;

deplaning a first group of passengers from the aircraft using the ramp assembly; and boarding a second group of passengers from the aircraft using the ramp assembly.

18. The passenger deplaning and boarding method of claim 17 wherein providing a ramp assembly including a level deck having a front deck edge, at least one bridge connector assembly carried by the level deck at the front deck edge and at least one floating upper bridge carried by the at least one bridge connector assembly comprises providing a ramp assembly including a level deck having a front deck edge, a pair of bridge connector assemblies carried by the level deck in spaced-apart relationship to each other along the front deck edge and a pair of spaced-apart floating upper bridges carried by the pair of bridge connector assemblies, respectively, and deploying the ramp assembly comprises aligning one of the pair of floating upper bridges with an aircraft door of the aircraft.

19. The passenger deplaning and boarding method of claim 17 further comprising attaching a main boarding ramp to the level deck of the ramp assembly, and wherein deplaning a first group of passengers from the aircraft and boarding a second group of passengers from the aircraft comprises deplaning a first group of passengers from the aircraft and boarding a second group of passengers from the aircraft using the ramp assembly and the main boarding ramp.

20. The passenger deplaning and boarding method of claim 17 further comprising removing the at least one floating upper bridge of the ramp assembly from the at least one aircraft door of the first aircraft, parking a second aircraft having at least one aircraft door, deploying the ramp assembly by aligning the at least one floating upper bridge of the ramp assembly with the at least one aircraft door of the second aircraft, supporting the at least one floating upper bridge in the at least one aircraft door of the second aircraft, deplaning a first group of passengers from the second aircraft using the ramp assembly and boarding a second group of passengers from the second aircraft using the ramp assembly.

* * * * *